United States Patent [19]
Martin et al.

[11] Patent Number: 5,126,047
[45] Date of Patent: Jun. 30, 1992

[54] MOLTEN METAL FILTER

[75] Inventors: Harvey Martin, Solon; George S. Mordue, Ravenna, both of Ohio

[73] Assignee: The Carborundum Company, Niagara Falls, N.Y.

[21] Appl. No.: 519,947

[22] Filed: May 7, 1990

[51] Int. Cl.$^5$ .......................... C21C 7/00; B01D 39/20
[52] U.S. Cl. .................................. 210/450; 210/455; 210/510.1; 75/412; 266/227; 266/236
[58] Field of Search ................. 210/450, 455, 510.1; 75/412; 266/227, 236

[56] References Cited

U.S. PATENT DOCUMENTS

| | | | |
|---|---|---|---|
| 4,390,355 | 6/1983 | Hammond et al. | 210/510.1 |
| 4,416,676 | 11/1983 | Montierth | 210/510.1 |
| 4,417,908 | 11/1983 | Pitcher | 210/510.1 |
| 4,591,383 | 5/1986 | McGarry et al. | 210/767 |

*Primary Examiner*—Robert A. Dawson
*Assistant Examiner*—David Reifsnyder
*Attorney, Agent, or Firm*—Larry W. Evans; Joseph G. Curatolo; Scott A. McCollister

[57] ABSTRACT

A molten metal filter includes a refractory plate having an opening therethrough. A refractory filter element is attached to the refractory plate and projects therefrom, the exterior surfaces of the filter element generally defining a rectangular prism. The filter element is hollow so as to define an interior cavity. The filter element includes an opening in that portion of the filter element that is attached to the refractory plate, the opening surrounding the opening in the refractory plate such that fluid communication is established between the cavity and the opening in the refractory plate. In the preferred embodiment, a plurality of filter elements are provided, which filter elements are connected to the refractory plate such that adjacent sides of the filter elements are oriented vertically and are disposed generally parallel to each other. It is preferred that the refractory plate be oriented generally vertically and disposed within a filter box so as to define an inlet chamber within which the filter elements are disposed, and an exit chamber through which filtered metal can be discharged from the filter box. Best results are obtained by forming the filter elements from a porous, refractory, ceramic material or glass frit-bonded or sintered silicon carbide or alumina, and by forming the refractory plate from a siliceous-based, castable, refractory material.

23 Claims, 3 Drawing Sheets

MOLTEN METAL FILTER

BACKGROUND OF THE INVENTION

1. Field of the Invention

The invention relates to the filtration of molten metal and, more particularly, to a relatively inexpensive molten metal filter that provides high flow rates while attaining excellent filtration capabilities.

2. Description of the Prior Art

In the course of casting molten metal, the metal first is reduced to a molten state at an elevated temperature by means of a furnace. After being liquified in the furnace, the molten metal is directed into a mold for casting, or it is directed into a secondary receiver such as a holding furnace from which it later is directed into a mold for casting.

One of the major detriments that an occur during the casting process is for impurities in the form of solids to be included in the molten metal as it is poured into the casting molds. These impurities can originate from metal being melted itself, the furnace in which the metal is melted, transport elements through which the metal is conveyed, or external sources such as oxidation from the atmosphere. The inclusion of such impurities in the metal being cast can result in castings of poor quality that will require that the resultant castings be scrapped. In addition to problems associated with solid impurities, it sometimes happens that the molten metal contains dissolved gases, such as hydrogen, oxygen, or nitrogen. During solidification of the molten metal in the casting molds, the gases may precipitate out of solution and form gas bubbles or pockets that also may negatively affect the quality of the finished metal casting.

In view of the problems that can arise from the presence of solid or gaseous impurities in molten metal being cast, it is desirable to remove those impurities before solidification commences. A variety of filters have beer proposed for that purpose. In general, these filters employ a porous, refractory filter medium that will withstand the temperatures of the molten metal being filtered while, at the same time, trapping impurities that are being passed through the filter element. Such filters have been provided in the form of horizontally oriented plates, vertically oriented plates, and disks that are disposed within conduits through which the molten metal is flowed.

A particularly effective molten metal filter is the MULTICAST filter system that is commercially available from the Metaullics Systems Division of The Carborundum Company, 31935 Aurora Road, Solon, Ohio 44139. In the MULTICAST filter system, a filter assembly is disposed within a holding furnace/filter box. The filter assembly includes a horizontally oriented sealing plate and several vertically oriented filter elements that are attached to the sealing plate. The filter elements ar<hollow and surround openings in the sealing plate through which molten metal can flow. The filter elements are made of a porous ceramic material in the form of bonded silicon carbide or alumina particles that create numerous tortuous flowpaths that provide effective filtration capability. Reference is made to U.S. Patent Application Ser. No. 06/661,543, filed Oct. 16, 1984, by Edwin P. Stankiewicz, entitled "Multiple-Use Molten Metal Filters,", the disclosure of which is incorporated herein by reference.

Another type of molten metal filter is a so-called cartridge filter. In a cartridge filter, a plurality of horizontally oriented, refractory tubes are disposed within a holding furnace/filter box. The ends of the tubes are attached to, and supported by, graphite end plates. One of the end plates is solid, while the other end plate includes openings that are in fluid communication with the hollow interiors of the refractory tubes. Molten metal is filtered by disposing the cartridge filter within the holding furnace/filter box and by bringing molten metal into contact with the exterior surfaces of the tubes. The molten metal flows through the tubes (where it is filtered) and is discharged through the openings in the end plate for conveyance into the casting molds.

Despite the filtration capabilities of prior art molten metal filters, particularly the MULTICAST molten metal filter and cartridge filters, certain problems remain. While the MULTICAST filter provides excellent filtration capability, its flow rate is less than desired for modern casting requirements. If molten aluminum is the metal being processed, the MULTICAST filter assembly can handle approximately 1,000–1,200 pounds per minute (with 6-grit particle size). Current industry trends demand that higher flow rates, i.e., 2,000–2,400 pounds per minute, be available. Desirably, an effective molten metal filter would be available that would have the filtration capability of the MULTICAST filter assembly, while providing higher flow rates.

Although a cartridge filter provides acceptable flow rates, certain problems have not been addressed by conventional cartridge filters. In particular, a cartridge filter is large and expensive. The configuration of the filter elements is such that a great deal of wasted space is taken up by the filter. Also, the use of two large graphite end plates unduly increases the expense of the filter assembly. Desirably, a molten metal filter would be available that would (1) have a higher flow rate capability than the MULTICAST filter assembly, (2) have excellent filtration capability (as with the MULTICAST filter assembly), (3) occupy much less space than a cartridge filter, and (4) be much less expensive than a cartridge filter.

SUMMARY OF THE INVENTION

The present invention addresses the foregoing concerns and provides a new and improved technique for filtering molten metal. The invention includes a refractory plate having a first opening therethrough. A first, refractor filter element is attached to the refractory plate and projects therefrom. In the preferred embodiment, the exterior surfaces of the filter element generally define a rectangular prism having a relatively narrow perimeter and relatively large, flat sides. The filter element is hollow so as to define an interior cavity. The filter element includes an opening in that face of the filter element that is attached to the refractory plate, the opening in the filter element surrounding the opening in the refractory plate such that fluid communication is established between the cavity, and the opening in the refractory plate.

In the preferred embodiment, a plurality of substantially identical filter elements are provided, the filter elements being attached to the refractory plate so as to surround a plurality of openings in the plate. The filter elements are arranged relative to each other such that adjacent sides of the filter elements are generally parallel with each other and are spaced a small distance adequate to permit molten metal to flow therebetween.

In the preferred embodiment, the invention includes a filter box that defines a chamber. A fluid inlet is provided through which molten metal can be directed into the chamber, and a fluid outlet is provided through which molten metal can be discharged from the chamber. The refractory plate with the attached filter elements is disposed within the chamber so as to divide the chamber into inlet and outlet sections. The filter elements are disposed within the inlet section. It is preferred that the refractory plate be oriented generally vertically, and that the filter elements project laterally from the refractory plate with the sides of the filter elements lying in vertical planes.

In use, molten metal is directed into the inlet section so that the molten metal flows around the filter elements. The molten metal passes through the filter elements, into the cavities, through the openings in the plate, and into the outlet section. If the filter elements are constructed of glass frit-bonded silicon carbide or alumina, exceedingly effective filtration capability can be attained. Further, if the refractory plate is constructed of a molten metal-resistant material such as a siliceous-based, castable refractory material, the plate will have a long life while having excellent performance capabilities.

It has been discovered that the filter according to the invention can provide filtration performance equivalent to that of a cartridge filter, while providing flow rat as equivalent to, or greater than, the MULTICAST filter assembly. Importantly, the filter according to the present invention provides the foregoing advantages, while occupying much less space than a cartridge filter and while having a manufacturing cost approximately half that of a cartridge filter. Unlike prior filters, the filter according to the invention can be removed and replaced by a new filter without requiring the furnace to cool down. This "hot change" capability is very important because it minimizes downtime of the casting equipment.

The foregoing and other features and advantages of the invention are illustrated in the accompanying drawings and are described in more detail in the specification and claims that follow.

DESCRIPTION OF THE PREFERRED EMBODIMENTS

Figure 1:
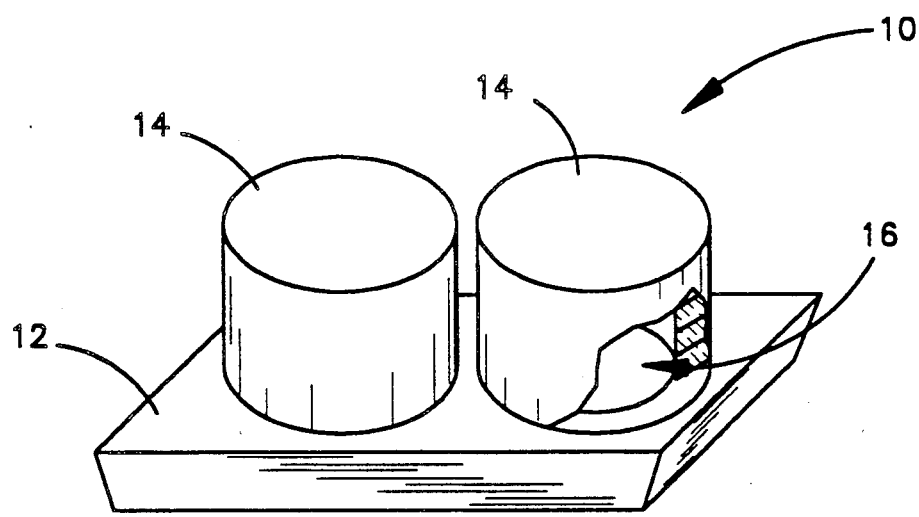
FIG. 1 is a schematic, perspective view of a MULTICAST filter assembly according to the prior art.
Figure 2:
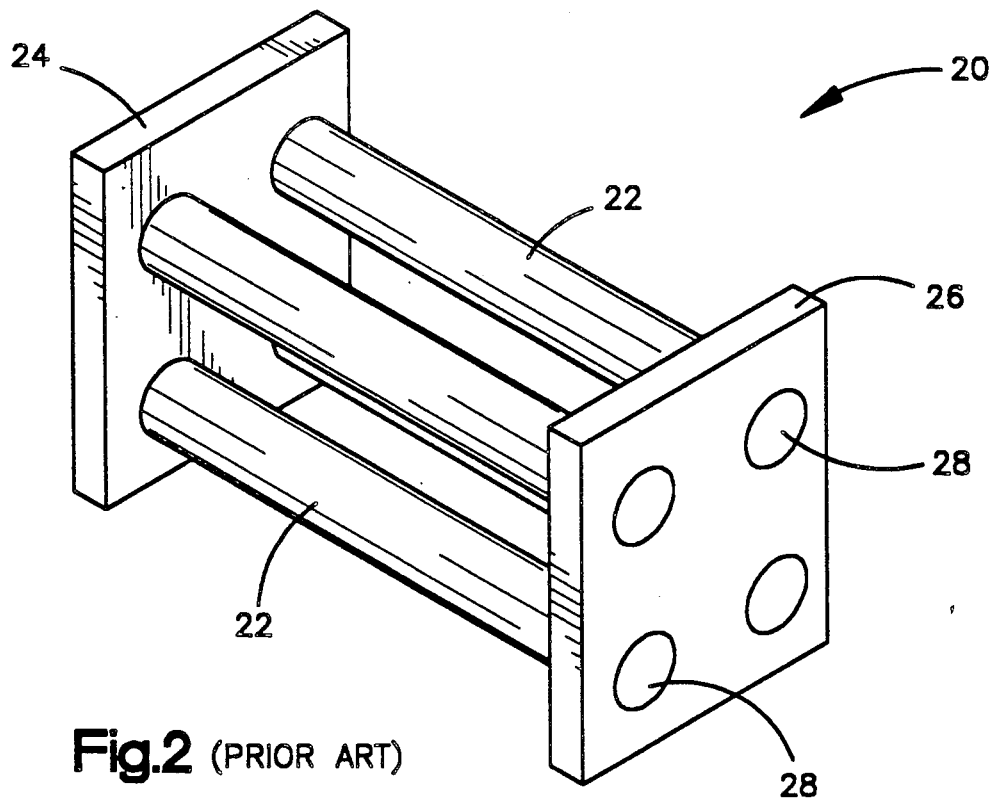
FIG. 2 is a schematic, perspective view of a cartridge filter according to the prior art.

Referring to FIGS. 1 and 2, molten metal filters according to the prior art are shown. In FIG. 1, a so-called MULTICAST filter assembly 10 includes a horizontally disposed sealing plate 12 to which vertically oriented, cylindrical filter elements 14 are attached. The plate 12 includes a plurality of openings (not shown) that are surrounded by the filter elements 14. The filter elements 14 are hollow so as to define an interior cavity 16. The filter elements 14 are formed of bonded or sintered ceramic particles such as silicon carbide or alumina that define a plurality of small, tortuous passageways. The sealing plate 12 is tightly fitted within a holding furnace/filter box (not shown) such that the filter elements 14 project upwardly. Molten metal directed into the filter box is filtered downwardly through the filter elements 14 into the cavities 16. Thereafter, the molten metal passes through the openings in the sealing plate 12 for discharge to casting molds. While the filter assembly 10 of FIG. 1 has been found to be exceedingly effective in practice, it has a maximum flow rate capability of approximately 1,000-1,200 pounds per minute when provided with four filter elements 14 made of 6-grit particle size.

Referring to FIG. 2, a cartridge filter according to the prior art is indicated generally by the reference numeral 20. The filter 20 includes a plurality of generally horizontally oriented cylindrical tubes 22 that are connected at their ends to a pair of spaced, generally parallel, graphite end plates 24, 26. Typically, 18 tubes 22 are provided, although only four are illustrated. The plate 26 includes a plurality of openings 28 that are in fluid communication with cavities defined by the hollow interiors of the tubes 22. In use, the filter 20 is disposed within a holding furnace/filter box. Upon directing molten metal into the holding furnace/filter box, the molten metal flows through the tubes 22 and into the hollow interiors thereof. Molten metal eventually is discharged through the openings 28 and thereafter is directed into casting molds.

While the filter 20 has good flow rate capabilities, it suffers from various drawbacks. The expense of the filter 20 is greater than desired, in part because two end plates 24, 26 are required, and in part because the tubes 22 must be quite long. In addition, the filter 20 has a great deal of wasted space because the tubes 22 cannot be placed very close to each other. Accordingly, while the filter 20 provides excellent filtration capability and flow rate capability, it is larger than desired and it is much more expensive than desired. Also, because the end plates 24, 26 are made of graphite, it is difficult to change the filter 20 while the holding furnace is hot, and the filter 20 cannot be preheated for long periods without the possibility of oxidizing the graphite end plates 24, 26. The cartridge filter 20 is a fragile assembly when hot that is likely to break upon attempted removal, substantially delaying return to service unless elaborate removal tools, requiring additional space to install and manipulate, are utilized. Because of these limitations, casting operations are disrupted for a greater period of time than is desired while a filter change is being accomplished.

Figure 3:
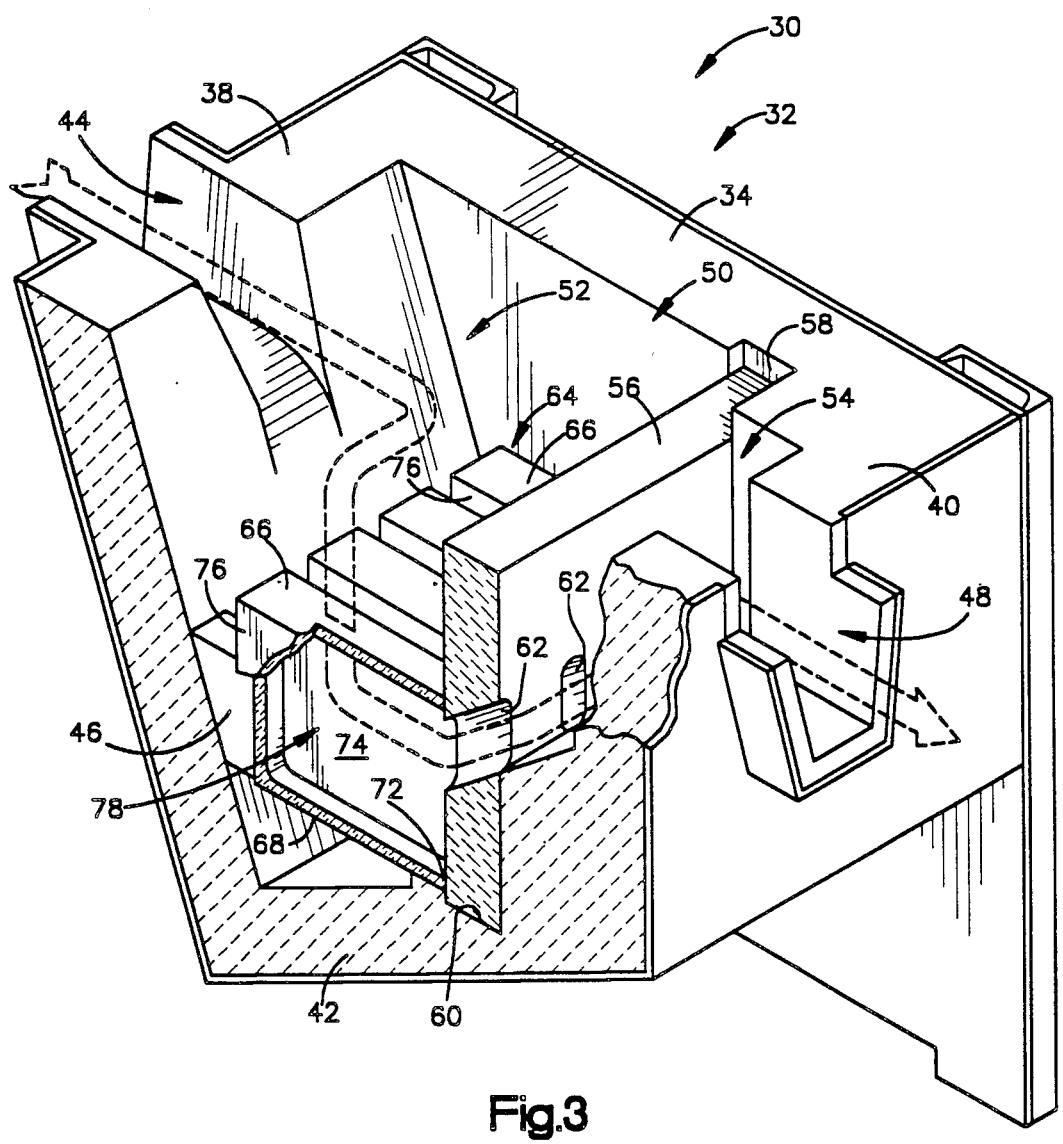
FIG. 3 is a schematic, perspective view of a molten metal filter according to the invention.
Figure 4:
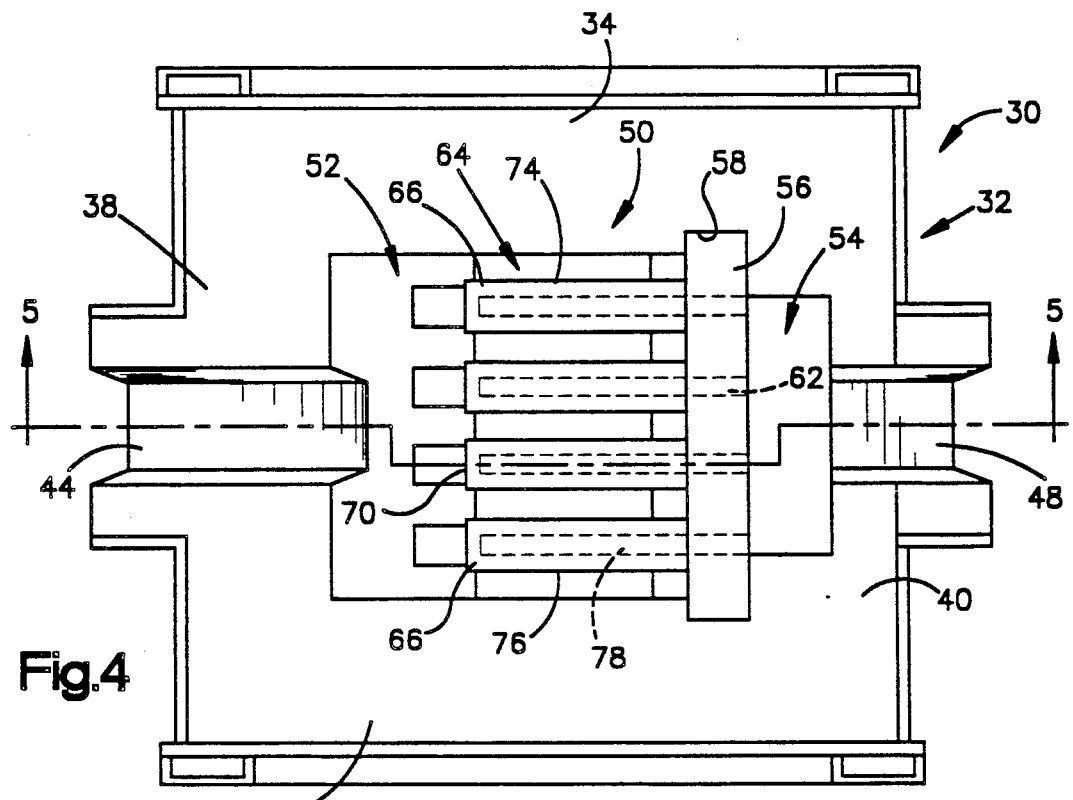
FIG. 4 is a top plan view of the molten metal filter of FIG. 3.
Figure 5:
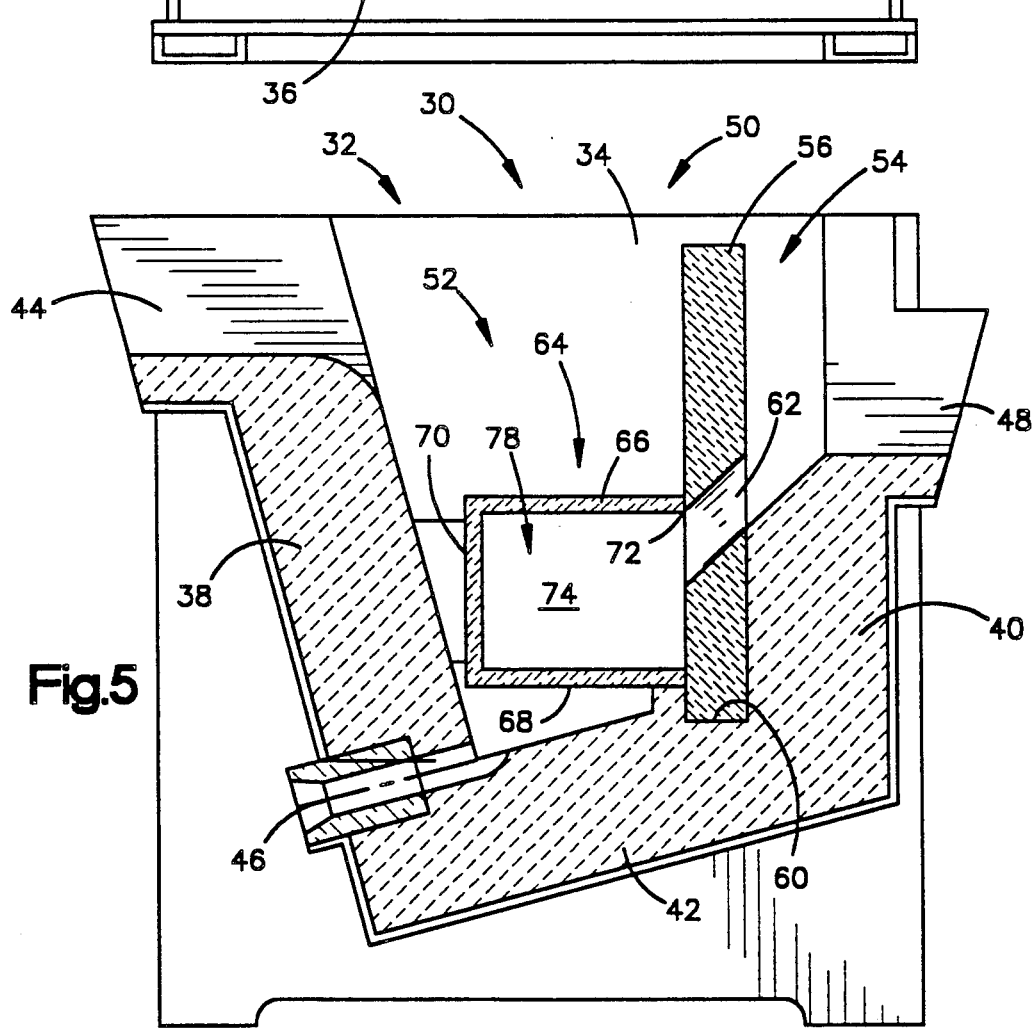
FIG. 5 is a cross-sectional view of the molten metal filter of FIG. 3 taken along a plane indicated by line 5—5 in FIG. 4.

Referring now to FIGS. 3-5, a molten metal filter according to the invention is indicated generally by the reference numeral 30. The filter 30 includes a holding furnace/filter box 32 (referred to hereinafter as "filter box 32"). The filter box 32 includes spaced, parallel side walls 34, 36, a first end wall 38, a second end wall 40, and a bottom wall 42. The first end wall 38 includes an opening 44 that defines a fluid inlet. A drain outlet 46 is provided at the intersection of &he first wall 38 and the bottom wall 42. The second end wall 40 includes an opening 48 that defines an outlet. The lowermost portion of the outlet 48 is at a lower vertical elevation than the lowermost portion of the inlet 44 (see FIG. 5).

The filter box 32 defines a chamber 50 having a first (inlet) section 52 and a second (outlet) section 54. A generally vertically oriented, refractory plate 56 is disposed within the chamber 50 so as to divide the chamber 50 into the first and second sections 52, 54. The plate 56 is retained within the filter box 32 in a fluid-tight manner by means of vertically oriented slots 58 that are formed in the side walls 34, 16. Similarly, the lowermost portion of the plate 56 is connected to the bottom wall 42 in a fluid-tight manner by means of a horizontally oriented slot 60 within which the lowermost portion of the plate 56 is disposed.

The plate 56 includes a plurality of openings 62 that are disposed laterally adjacent each other. The openings 62 extend completely through the plate 56. As shown in FIGS. 3 and 5, the openings 62 include an entrance end that is at a lower elevation than the exit end. The uppermost portion of the exit end of the openings 62 is approximately level with the lowermost portion of the outlet 48.

The filter 30 includes a plurality of filter elements 64 that are attached to the plate 56 so as to extend laterally from the plate 56 into the first section 52. Each of the filter elements 64 includes a top wall 66, a bottom wall 68, an end wall 70, an open end 72, and opposed side walls 74, 76. The filter elements 64 each are in the form of a rectangular prism. The top wall 66, bottom wall 68, and end wall 70 are narrow so as to define a relatively narrow perimeter; the side walls 74, 76 are relatively large and flat. The filter elements 64 are hollow so as to define an interior cavity 78. The cavity 78 is of a size and shape such that the walls 66, 68, 70, 74, 76 are of substantially uniform thickness. If desired, the walls 70, 74, 76 could be thicker at the bottom than at the top in order to accommodate differences in head along the vertical dimension of the filter elements 64. Also if desired, the top wall 66, the bottom wall 68, and the end wall 70 could be non-planar. The most important requirement is that the side walls 74, 76 be planar for a reason to be discussed hereinafter.

The filter elements 64 are attached to the plate 56 such that the open end 72 of each filter element 64 completely surrounds one of the openings 62. The attachment between the filter elements 64 and the plate 56 is made by a refractory cement such as that sold under the trademark FRAXSET by Metaullics Systems of Solon, Ohio. FRAXSET refractory cement has exceptional strength and resistance to corrosion in molten aluminum are zinc applications. The refractory cement provides a strong, fluid-tight connection between the filter elements 64 and the refractory plate 56.

As shown in FIG. 3-5, the filter elements 64 are arranged relative to each other such that the side walls 74, 76 of adjacent filter elements 64 are spaced a small distance and are disposed generally parallel to each other. This particular arrangement of the filter elements 64 provides that the filter 30 will have a high flow capability while occupying a relatively small space within the chamber 50.

It is expected that the filter elements 64 will be porous structures formed of bonded or sintered particles (grains) such as 6-grit, 10-grit, or 20-grit silicon carbide or alumina. Preferably the particles are bonded by means of a glass frit. A suitable filter material made of silicon carbide or alumina is commercially available from Metaullics Systems of Solon, Ohio. The filter members 64 have a porosity of approximately 15–38 percent. Other grit sizes may be employed for finer or coarses filtration as may be desired, it being recognized that changing the grit size will affect the flow rate of the filter elements 64. The filter elements 64 also could be made of a ceramic material such as that marketed by Metaullics Systems of Solon, Ohio under the mark "Carborundum Ceramic Filter." The filter elements 64 are refractory due to the material from which they are made, and thus they will withstand the temperatures encountered in the processing of molten metals.

The refractory plate 56 preferably s formed of a molten aluminum-resistant, siliceous-based, castable refractory material, rather than graphite as has been used heretofore for certain components of molten metal filters. A suitable material for the plate 56 is commercially available from Perma&ech, 911 Elm Street, Graham, N.C. By using a siliceous-based, castable material, rather than graphite, the expense of the filter 30 is reduced. This is due in part to the relative inexpensiveness of the siliceous-based castable material, as well as the fact that the siliceous-based material can be cast instead of machined (graphite end plates must be machined—a more expensive and time-consuming operation). Also, unlike graphite, a siliceous-based refractory material can be preheated in advance without oxidizing. Importantly, the filter 30 can be removed from the filter box 32 without requiring that the filter box 32 be cooled. A new filter 30 can be installed quickly because the replacement filter 30 can be preheated in advance of installation. This "quick change" capability minimizes downtime of the casting equipment.

OPERATION

In operation, molten metal is directed into the first section 52 through the inlet opening 48. The molten metal gradually will rise within the first section 52 and eventually will surround the filter elements 64.

As molten metal rises around the filter elements 64, it will flow through the filter elements 64 into the cavities 78. Filtration will be accomplished as the molten metal passes through the filter elements 64. Eventually, the molten metal within the cavities 78 will flow through the openings 62 and into the outlet chamber 54. As the molten metal rises higher, eventually it will flow out of the outlet chamber 54 through the outlet 48.

As shown in FIGS. 3-5, four filter elements 64 are provided. It will be understood that a different number of filter elements 64 may be employed, if desired. The filter elements 64 typically will project about 14.0 inches from the plate 56. The filter elements 64 are about 12.0 inches high, and about 3.0 inches wide. The filter elements 64 have a wall thickness of about 1.15 inch. The side wall-to-side wall spacing of adjacent filter elements 64 is within the range of about 1.0–2.0 inches. By spacing the filter elements 64 in this manner, the volumetric efficiency of the filter 30, that is, the surface area available for filtration divided by the volume occupied by the filter elements and any intervening spaces, is very high. The spacing between adjacent filter elements 64 is great enough, however, that the exterior surfaces of the filter elements 64 can be cleaned periodically by means of a hand-held, pressurized lance.

The uppermost portion of the openings 62 at the entrance side of the plate 56 is about 4.0 inches lower than the uppermost portion of the openings 62 at the exit side of the plate 56. Accordingly, metal filtered by the filter elements 64 must pass upwardly from the cavities 78 into the outlet section 54 for discharge through the outlet 48. This flow path for the filtered metal provides a smooth, non-turbulent transition for the metal flowing out of the filter 30.

The following tables set forth a comparison of performance criteria among the MULTICAST filter assembly 10, the cartridge filter 20, and the filter 30 according to the invention.

TABLE I

Mean Surface Area Available for Filtration (ft$^2$)

| | |
|---|---|
| MULTICAST Filter Assembly 10 | approx. 5.2 |
| Cartridge Filter 20 | approx. 40.0 |
| Filter 30 (invention) | approx. 12.0 |

TABLE II

Volumetric Efficiency (mean surface area/volume of filter elements and spaces)

| | |
|---|---|
| MULTICAST filter assembly 10 | 5.85/ft |
| Cartridge Filter 20 | 5.71/ft |
| Filter 30 (invention) | 7.71/ft |

TABLE III

Maximum Flow Rate (lb/min.) versus Grit Size

| Grit Size of Filter Elements | MULTICAST Filter Assembly 10 | Cartridge Filter 20 | Filter 30 (Invention) |
|---|---|---|---|
| 6-grit | 1,000-1,200 | 2,500-3,500 | 2,000-2,400 |
| 10-grit | 500-700 | 1,600-1,800 | 1,000-1,200 |
| 20-grit | 60-100 | 300-400 | 100-200 |

TABLE IV

Flow Rate Efficiency (Maximum Flow Rate × Volumetric Efficiency (lb/min./ft)) for 6-grit Filter Elements

| | |
|---|---|
| MULTICAST Filter Assembly 10 | 5.85-7.02 ($\times 10^3$) |
| Cartridge Filter 20 | 14.28-19.99 ($\times 10^3$) |
| Filter 30 (invention) | 15.42-18.50 ($\times 10^3$) |

Table I shows that the cartridge filter 20 has about eight times the surface area available for filtration as the MULTICAST filter assembly 10, and about three and one-third times the surface area available for filtration as the filter 30. Accordingly, while Table III shows that the cartridge filter 20 has higher maximum flow rates than either the MULTICAST filter assembly 10 or the filter 30 for any given grit size, nevertheless the respective volumetric efficiencies must be taken into account in order to obtain a true comparison of the filtration efficiency of the various filters.

Table II shows that the volumetric efficiency of the filter 30 is about 1.35 times that of the cartridge filter 20, and about 1.32 times that of the MULTICAST filter assembly 10. Referring now to Table IV, it can be seen that the filter 30 has a flow rate efficiency about equal to that of the cartridge filter 20, and about 2.65 times that of the MULTICASI filter assembly 10. The net result is that for a given volume occupied by the various filters, the filter 30 will be far more effective in terms of the surface area available for filtration and maximum flow rate.

Another way of interpreting Table I, is that because the filter 30 has a substantially greater flow rate efficiency vis-a-vis the MULTICAST filter assembly 10 for 6-grit filter elements, the filter 30 can be provided in a finer grit (so as to achieve finer filtration) while maintaining a comparable flow rate efficiency. With respect to the cartridge filter 20, the filter 30 can provide a comparable flow rate efficiency while occupying much less volume and while costing much less to manufacture. These are significant advantages that render the filter 30 very desirable for casting operations.

In addition to the favorable volumetric and flow rate efficiencies of the present invention, the filter 30 also has a high throughput potential, that is, the amount of metal that can be filtered before a filter change is required. It is expected that the filter elements 64 will have a throughput potential of about 2.0-4.0 million pounds, depending on flow rate, cleanliness of the molten metal being filtered, the type of molten metal being filtered, the head of the molten metal being filtered, and the grit size of the filter elements.

Other advantages of the present invention include the ease with which the filter elements 64 can be manufactured. Because the exterior surfaces of the filter elements 64 define a rectangular prism, the tooling that is used to manufacture the filter elements 64 is straight-sided. Accordingly, the tooling can be made of assembled flat plates, thereby reducing the manufacturing expense of the filter elements 64. While certain portions of the filter elements 64 can be provided in a non-flat configuration, any such deviation from a flat surface will increase the manufacturing expense of the filter elements 64.

Another advantage of the present invention relates to the ease with which the filter 30 can be changed. By providing eyelets (not shown) at the upper edge of the plate 56, the plate 56, with filter elements 64 attached, can be lifted easily out of the filter box 32. When a replacement filter 30 is to be installed, it can be installed easily and quickly simply by sliding the plate 56 downwardly within the slots 58. The interaction between the plate 56 and the slots 58 thus enables the filter 30 to be changed faster than other types of filters can be changed.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A filter element for a molten metal filter, consisting of:
 a refractory member in the form of a rectangular prism having exterior surfaces and having a narrow perimeter and large, flat sides, the member being hollow so as to define a single interior cavity, the member including an opening through one face, the member being constructed such that molten metal can flow through the exterior surfaces of the member into the cavity and thereafter can flow out of the cavity through the opening.

2. The filter element of claim 1, wherein the cavity is of a size and shape such that the member has a substantially uniform wall thickness.

3. The filter element of claim 1, wherein the refractory member includes an upper perimeter and a lower perimeter and wherein the cavity is a of size and shape that the member, when oriented with the sides laying in vertical planes, has a side wall thickness tapering from a given dimension adjacent the upper perimeter to a larger dimension adjacent the lower perimeter.

4. The filter element of claim 1, wherein the member is formed of glass frit-bonded or sintered silicon carbide or alumina.

5. The filter element of claim 1, wherein the member is formed of a porous, refractory, ceramic material.

6. A molten metal filter, comprising:
- a refractory plate having a first opening therethrough; and
- a first, refractory filter element attached to the refractory plate and projecting therefrom, the filter element defining a rectangular prism having exterior surfaces and having a narrow perimeter and large, flat sides, the filter element being hollow so as to define an interior cavity, the filter element including an opening at that portion of the filter element that is attached to the refractory plate, the opening in the filter element surrounding the first opening in the refractory plate such that fluid communication is established between the cavity and the first opening in the refractory plate.

7. The molten metal filter of claim 6, further comprising:
- a second opening in the refractory plate disposed adjacent to the first opening in the refractory plate; and
- a second, refractory filter element attached to the refractory plate and projecting therefrom, the exterior surfaces of the second filter element generally defining a rectangular prism having a narrow perimeter and large, flat sides, the second filter element being hollow so as to define as interior cavity, the second filter element including an opening in that portion of the second filter element that is attached to the refractory plate, the opening in the second filter element surrounding the second opening in the refractory plate such that fluid communication is established between the cavity and the second opening in the refractory plate; and
- the first and second filter elements being arranged relative to each other such that adjacent sides of the first and second filter elements are parallel with each other and are spaced a small distance adequate to permit molten metal to flow therebetween.

8. The molten metal filter of claim 6, further comprising:
- a plurality of openings in the refractory plate, the openings being disposed laterally adjacent each other;
- a plurality of refractory filter elements attached to the refractory plate and protecting therefrom, each of the filter elements including exterior surfaces that define a rectangular prism having a narrow perimeter and large, flat sides, the filter elements being hollow so as to define an interior cavity, the filter elements including an opening in that portion of the filter elements that are attached to the refractory plate, the openings in the filter elements surrounding respective openings in the refractory plate such that fluid communication is established between the cavity of each filter element and an opening in the refractory plate; and
- the filter elements being arranged relative to each other such that adjacent sides of the filter elements are parallel with each other and are spaced a small distance adequate to permit molten metal to flow therebetween.

9. The molten metal filter of claim 6, wherein the cavity is of a size and shape such that the filter element has a substantially uniform wall thickness.

10. The filter element of claim 6, wherein the refractory member includes an upper perimeter and a lower perimeter and wherein the cavity is of a size and shape that the member, when oriented with the sides lying in vertical planes, has a side wall thickness tapering from a given dimension adjacent the upper perimeter to a larger dimension adjacent the lower perimeter.

11. The molten metal filter of claim 6, wherein the filter element is formed of glass frit-bonded or sintered silicon carbide or alumina.

12. The molten metal filter of claim 6, wherein the filter element is formed of a porous, refractory, ceramic material.

13. The molten metal filter of claim 6, wherein the refractory plate is made of a siliceous-based, castable, refractory material.

14. The molten metal filter of claim 6, wherein the refractory plate is oriented vertically, and the filter element projects laterally from the refractory plate with the sides of the filter element lying in vertical planes.

15. The molten metal filter of claim 14, wherein the opening in the refractory plate includes an entrance end on one side of the plate and an exit end on the other side of the plate, the exit end being at a higher elevation than the entrance end.

16. A molten metal filter, comprising:
- a refractory box defining a chamber, the box having an inlet through which molten metal can be directed into the chamber and an outlet through which molten metal can be discharged from the chamber;
- a vertically oriented refractory plate disposed within the chamber, the plate dividing the chamber into first and second sections, the first section being in fluid communication with the inlet and the second section being in fluid communication with the outlet, the refractory plate including an opening that provides fluid communication between the first and second sections; and
- a refractory filter element attached to the plate end projecting therefrom, the filter element being disposed within the first section, the filter element including exterior surfaces that define a rectangular prism having a narrow perimeter and large, flat sides, the filter element being hollow so as to define an interior cavity, the filter element including an opening in that portion of the filter element that is attached to the refractory plate, the opening in the filter element surrounding the opening in the refractory plate such that fluid communication is established between the cavity and the opening in the refractory plate.

17. The molten metal filter of claim 16, further comprising:
- a plurality of openings in the refractory plate, the openings being disposed laterally adjacent each other;
- a plurality of refractory filter elements attached to the refractory plate and projecting therefrom, the filter elements being disposed within the first section, the exterior surfaces of each of the filter elements defining a rectangular prism having a narrow perimeter and large, flat sides, the filter elements being hollow so as to define interior cavities, the filter element including openings in that portion of the filter elements that are attached to the refractory plate, the openings in the filter elements surrounding the openings in the refractory plate such that fluid communication is established between the cavities and the openings in the refractory plate; and the filter elements being arranged relative to each other such that adjacent sides of the filter elements are disposed parallel to each other and are spaced a small distance adequate to permit molten metal to flow therebetween.

18. The molten metal filter of claim 16, wherein the cavity is a size and shape such that the filter element has a substantially uniform wall thickness.

19. The filter element of claim 16, wherein the refractory member includes an upper perimeter and a lower perimeter and wherein the cavity is of a size and shape that the member, when oriented with the sides lying in a vertical planes, has a side wall thickness tapering from a given dimension adjacent the upper relative to a larger dimension adjacent the lower perimeter;

20. The molten metal filter of claim 16, wherein the filter element is formed of glass frit-bonded or sintered silicon carbide or alumina.

21. The molten metal filter of claim 16, wherein the filter element is formed of porous, refractory, ceramic material.

22. The molten metal of claim 16, wherein the refractory plate is formed of a siliceous-based, castable, refractory material.

23. The molten metal filter of claim 16, wherein the opening in the refractory plate includes an entrance end on one side of the plate and an exit end on the other side of the plate, the exit end being at a higher elevation than the entrance end.

* * * * *